(12) United States Patent
O'Meara et al.

(10) Patent No.: US 8,706,542 B2
(45) Date of Patent: Apr. 22, 2014

(54) ALLOCATION OF LOCATION-BASED ORDERS TO MOBILE AGENTS

(75) Inventors: Cian E O'Meara, Fermoy (IE); Michael Brosnan, Knocknacarra (IE); Paul Kelly, Galway (IE); Derek Hyland, Bohermore (IE); Damian Killeen, Ballydangan (IE)

(73) Assignee: Apple Inc., Cupertino, CA (US)

( * ) Notice: Subject to any disclaimer, the term of this patent is extended or adjusted under 35 U.S.C. 154(b) by 3186 days.

(21) Appl. No.: 09/740,201

(22) Filed: Dec. 18, 2000

(65) Prior Publication Data

US 2002/0077876 A1 Jun. 20, 2002

(51) Int. Cl.
*G06Q 10/06* (2012.01)
(52) U.S. Cl.
USPC .......................................... 705/7.16
(58) Field of Classification Search
USPC ................................. 705/8, 9, 7.16
See application file for complete search history.

(56) References Cited

U.S. PATENT DOCUMENTS

| | | | | |
|---|---|---|---|---|
| 5,913,201 A * | 6/1999 | Kocur | ................................. | 705/9 |
| 5,943,652 A * | 8/1999 | Sisley et al. | ........................ | 705/9 |
| 6,026,375 A * | 2/2000 | Hall et al. | ........................ | 705/26 |
| 6,587,851 B1 * | 7/2003 | Ditcharo et al. | .................... | 707/6 |
| 2001/0027481 A1 * | 10/2001 | Whyel | ............................ | 709/218 |
| 2001/0047287 A1 * | 11/2001 | Jacobs et al. | ....................... | 705/9 |
| 2002/0065700 A1 * | 5/2002 | Powell et al. | ...................... | 705/9 |

OTHER PUBLICATIONS

Klein et al, Multi-Criteria Scheduling Optimization Using Fuzzy Logic, Systems, Man, and Cybernetics, 1998. 1998 IEEE International Conference on (vol. 1 ) 445-450 vol. 1.*
Kathryn A. Dowsland, Nurse scheduling with tabu search and strategic oscillation, European Journal of Operational Research, vol. 106, Issues 2-3, Apr. 16, 1998, pp. 393-407.*

* cited by examiner

*Primary Examiner* — Andre Boyce
(74) *Attorney, Agent, or Firm* — Meyertons, Hood, Kivlin, Kowert & Goetzel, P.C.

(57) ABSTRACT

A method of allocating a location-related order to one of a number of mobile agents, such as taxicabs, delivery or repair vehicles. The method involves the following steps:
 a) holding current order details which identify at least the location and time at which each agent is expected to become free to fulfill new orders;
 b) keeping a listing of locations, where each location in the listing is prioritised for an agent according to the availability of the agent to reach that location after the agent becomes free;
 c) receiving a new order and recording the location and time at which this order is to be fulfilled;
 d) deciding, based on the prioritised listing of locations, which agent(s) are most suitable to take the new order; and
 e) allocating the new order to the identified agent(s).

31 Claims, 7 Drawing Sheets

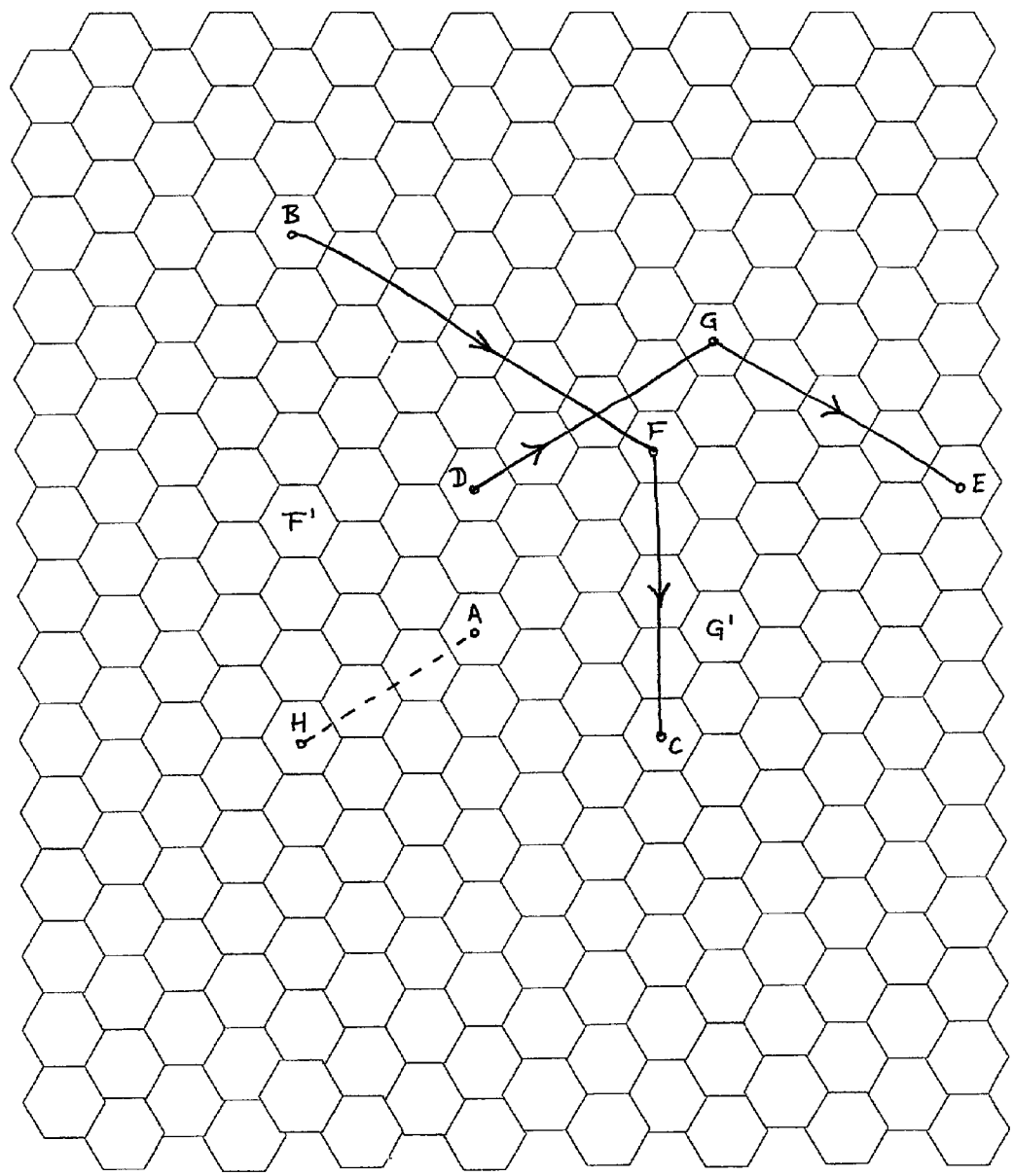

| Taxi #1 | | |
|---|---|---|
| Start Position | Destination | Time at Destination |
| B | C | 11.10 |
| | | |
| | | |

FIG. 2A

| Taxi #2 | | |
|---|---|---|
| Start Position | Destination | Time at Destination |
| D | E | 11.07 |
| | | |
| | | |

FIG. 2B

| Taxi #1 | | | |
|---|---|---|---|
| Start Position | Destination | Time at Destination | LCO |
| 65 | 165 | 11.10 | |
| 165 | 117 | 11.13 | |
| 117 | 72 | 11.16 | |
| | | | |
| 19 | 117 | 14.10 | |

FIG. 6

|     | 001 | 002 | 003 | ..... | 047 | 048 |
|-----|-----|-----|-----|-------|-----|-----|
| 001 | -   | 1   | 2   |       | 3   | 3   |
| 002 | 1   | -   | 1   |       | 3   | 3   |
| 003 | 2   | 1   | -   |       | 3   | 4   |
| 004 | 3   | 2   | 1   |       | 4   | 5   |
| 005 | 4   | 3   | 2   |       | 5   | 6   |
| 006 | 5   | 4   | 3   |       | 6   | 7   |

FIG. 4

| Skillset for Taxi #1 ||
|------|-------|
| Cell | Time  |
| 165  | 11.10 |
| 149  | 11.11 |
| 150  | 11.11 |
| 164  | 11.11 |
| 166  | 11.11 |
| 180  | 11.11 |
| 181  | 11.11 |
| ...  | ...   |
| ...  | ...   |
| 133  | 11.12 |
| ...  | ...   |
| ...  | ...   |
| 117  | 11.13 |
| ...  | ...   |
| ...  | ...   |

FIG. 5A

| Skillset for Taxi #2 ||
|------|-------|
| Cell | Time  |
| 239  | 11.07 |
| 223  | 11.08 |
| 224  | 11.11 |
| 238  | 11.11 |
| 240  | 11.11 |
| ...  | ...   |
| ...  | ...   |
| ...  | ...   |
| 133  | 11.13 |
| ...  | ...   |
| ...  | ...   |
| 117  | 11.16 |
| ...  | ...   |

FIG. 5B

ALLOCATION OF LOCATION-BASED ORDERS TO MOBILE AGENTS

FIELD OF THE INVENTION

The present invention relates to the allocation of location-based orders to mobile agents. The invention has particular application for mobile agents such as, for example, delivery vehicles, taxis, or repair services.

BACKGROUND OF THE INVENTION

When a customer requests the provision of a service from a mobile agent such as a taxi, a call can be made directly to a driver of a taxi, but more commonly, one will call an ordering service responsible for assigning orders to a number of taxis which subscribe to or are employed by the ordering service.

Traditionally, such services have utilised a dispatcher who is responsible for matching orders to drivers by querying drivers as to their current location and/or destination, and using their knowledge of the geography and traffic conditions faced by the respective drivers, assigning the orders (for which the pick-up point and time are known from the responses of callers) to particular drivers.

This system is however limited by the knowledge of the dispatcher and therefore subject to human error. In consequence, the resources of the service are not utilised to their maximum potential and users of the service (i.e. customers) do not have the best available service.

Apart from taxi ordering services, the same types of problems are faced by other mobile agent assignment services. For example, if a number of repair personnel are available within a city to respond to requests to repair equipment, it is important to choose the most suitable person to respond to a request for repair services (which generally means the person who can first arrive at the location where the repair is required).

It is possible to add an element of automation by using global positioning system (GPS) information obtained from the customers and/or agents to determine the closest available agent to a current customer. However the customer may not, at the time of the call, be at the location where the service has been requested, and the agent closest to the customer at the time of the call may not be the most suitable agent to take the order, because the agent may be moving away from the caller or because the agent may not become free for a considerable time.

The invention has as an object the provision of an improved method of assigning orders or tasks to mobile agents which make a better use of the available agents and which reduce the human error element of such assignments.

It is therefore an object of the present invention to provide an improved method of assigning location-based orders to mobile agents, and to provide apparatus and computer program products for use in such applications.

SUMMARY OF THE INVENTION

The invention provides a method of allocating an order which is location-related to one of a number of mobile agents. The method involves the following steps:
 a) holding current order details which identify at least the location and time at which each agent is expected to become free to fulfil new orders;
 b) keeping a listing of locations, where each location in the listing is prioritised for an agent according to the availability of the agent to reach that location after the agent becomes free;
 c) receiving a new order and recording the location and time at which this order is to be fulfilled;
 d) deciding, based on the prioritised listing of locations, which agent(s) are most suitable to take the new order; and
 e) allocating the new order to the identified agent(s).

By keeping track of the locations and times at which agents will be free, and by deciding in advance which locations each agent is best able to service, orders can be promptly processed and assigned to the most suitable agent.

Thus, when an order is received, it is not necessary to query each agent in advance as to the final location of that agent and then arrive at a value judgement as to which agent will be able to reach the customer first. Instead, the location details of the order can simply be compared with the position of that location in the prioritised listing for each agent to identify the agent who can reach the customer earliest. This improves customer service levels, and reduces the detailed local knowledge normally required for dispatching positions.

The current order details can be stored separately for each agent in an individual current order file relating only to that agent. Alternatively one can maintain a combined current order file relating to a number of agents, with the location and time at which each agent will be free identified for each such agent.

It is presently preferred to have individualised agent order files, as this enables the agent or a supervisor to access an agent's file and see at a glance the orders which are assigned. Each agent can have a profile in which the order details are kept and constantly updated.

Similarly, one has the option of maintaining for each agent an individual prioritised location listing relating only to that agent, or alternatively, a combined prioritised location listing relating to a number of agents, with each location being prioritised for one or more agents according to the ability of each such agent to reach each location after the agent becomes free.

Again, it is preferred to have individualised files for each agent, since a simple computerised matching function can scan down through each agent's profile to select the agent(s) having the highest priority rating for the locality where the new order is to be serviced. In a combined listing, the location of the new order can be looked up, and the priority ratings for the agents who will be free to service the order can be read directly.

The method of the invention will preferably also involve updating the current order details for the identified suitable agent after the new order has been assigned to that agent, with a new first location and first time at which the agent is now expected to become free.

This is preferably a dynamic process, with the current order files and the prioritised location listings being constantly updated as new orders come in.

Depending on the degree of control which the service retains over the agents, the allocation of the order can be a single step, in which agents are simply told where to go next, or there can be a multi-step process of:
 i) offering the order to the selected agent(s); and
 ii) receiving confirmation of acceptance of the order from the agent.

The former may be more suitable for employees of e.g. a repair service, whereas the latter allows flexibility if agents have a degree of autonomy (e.g. many taxicab drivers subscribe to a radio dispatch service but wish to be free to take additional orders of their own initiative).

At a minimum the current order record identifies the location and time when an agent will be free, but preferably this will also include details of the locations and times relating to all current orders assigned to each agent.

If an agent wishes to change the details in this file (e.g. if a repair job is taking longer than expected or a taxicab takes an order on the street), then there is a possibility for the agent in question to vary the stored details of current orders.

Preferably, the priority of each location in the listing is identified by a time at which the agent is expected to be able to reach the location. This can be dynamically updated due to changes in circumstances (e.g. an agent is caught in traffic, or an earlier order takes longer than expected, leading to knock on delays).

Alternatively, the priority of each location can be identified by a priority identifier calculated from (i) the distance between each location in the listing and the location where the agent currently expects to become free, and (ii) the time between the current time and the time when it is expected that the agent will be free.

Thus, an agent who is some time away from finishing all currently assigned orders will tend to have a lower priority rating for all locations in the listing. As time progresses and the agent nears completion, the priority ratings will all rise. Similarly, if the agent's final current destination is remote from some of the location listings but close to others, the priority for those remote locations will be lower than for the closer locations.

The "distance" in the sense referred to above can be a true geographical distance.

Alternatively, the "distance" may be a distance calculated in a non-linear representation of an area which includes the locations. Thus, while two streets might be in fact quite close to one another, a taxi dispatching service could plot these on a non-linear map as being quite far from one another if it was difficult to travel quickly from one to the other due to street layouts or prevailing traffic conditions. An analogy of this is seen in the representations of city underground systems which are often non-linear. While two stations might be within walking distance overground, they might be very inaccessible to one another if they are on different lines, and the map viewed by the commuter will reflect this and show a long route between the two stations.

The representation can be, for example, a grid of cells to which locations are mapped (so that a street address or building is classified as being in cell B-27 of the city grid, for example). It can equally be, a set of groups of locations (so that a database simply holds listings of adjacent locations, and classifies any address according to its grouped listing. Again, it could also be in the form of a mesh of elements, not necessarily in a regular pattern, to which locations are mapped.

The method preferably includes, in addition to updating the current order details, the step of updating the prioritised listing for the agent to which an order has been allocated, to take account of the new location and new time at which the agent is now expected to become free.

The time at which the agent is expected to become free may be calculated from a journey time file which records expected journey times between locations. This journey time file can be updated to take account of traffic or weather conditions, or indeed it can be built up over time based on real times taken for journeys by agents.

For example, initial expected journey times can be input into the journey times file. One can then monitor journeys through the area using GPS equipment carried by the agents, and then vary the times based on average journeys. An administrator can add times to all journeys during rush hour, or this can be done automatically throughout the day. One can monitor traffic reports and assign traffic heaviness levels to various areas to vary journey times. The map of the area can be presented graphically to an administrator who assigns colours (green, orange red) to ascending levels of congestion in areas of the map, following which the system will add assigned percentages to journey time through each colour coded area.

Instead of or in addition to use of a journey times file, the expected time at which an agent is expected to be free can be input by an operator based on an expected journey time. This operator can be the agent to which the current order record relates.

As indicated above, the step of maintaining the current order record may include providing access to an agent to the current order record to edit the order details.

The current order file can also include details of an advance order, which includes an advance order location time at which the advance order is to be fulfilled, and step d) then includes the step of determining whether the agent is expected to be able to finish the new location-based order with sufficient time to fulfil the advance order.

The invention also provides a method of operating a location-based ordering server for controlling orders in respect of a number of mobile agents, This method involves the steps of:
a) maintaining a current order record identifying for each agent a first location and first time at which the agent is expected to become free to fulfil a new order;
b) maintaining a listing of locations, with locations in the listing being prioritised for each agent according to the availability of the agent to reach each location after the agent becomes free; and
c) updating the current order record and prioritised listing for an agent when a new order has been assigned to the agent resulting in a new first location and first time being identified.

In a further aspect there is provided an ordering server for allocating location-based orders to a number of mobile agents associated with the server, the server including:
a) a current order file storage area for maintaining a current order file which identifies for each agent a first location and first time at which the agent is expected to become free to fulfil a new order;
b) a location priority listing storage area for maintaining a listing of locations, with locations in this listing being prioritised for each agent according to the availability of the agent to reach each location after the first time;
c) an input interface for receiving a location-based order and recording the location and time at which the order is to be fulfilled;
d) a processor for determining from the prioritised listing a suitable agent to fulfil the order; and
e) an output interface for allocating the order to the identified agent.

The input interface can include an operator interface for an operator to input details received from an ordering party.

The input interface can also be a web server hosting a user interface via which ordering parties can input order details, a WAP server hosting a user interface via which ordering parties can input order details, an interactive voice response (IVR) unit via which a user can input order details, or an SMS gateway for receiving SMS messages containing order details.

The server can further include a map database correlating real geographical locations with location identifiers for use in the current orders file and prioritised listing.

The server can also include a journey times calculator for calculating an expected journey time between two locations.

The ordering server can also include an agent interface for an agent to access and edit the current orders file. The output interface from the server may also act as an input interface for the agent to connect to the server.

The invention further provides a communications network including an ordering server of the invention.

In another aspect the invention provides an agent profile for use in allocating orders to a mobile agent, including:
a) a current order file identifying a first location and first time at which the agent is expected to become free to fulfil a new order; and
b) a prioritised listing of locations, with locations in the listing being prioritised according to the availability of the agent to reach each location after that first time.

In an agent profile according to the invention, the current orders file may further include details of all orders currently assigned to the agent.

These details may include a differentiation between current orders which are to be fulfilled immediately and advance orders.

Preferably, the current orders file (and indeed the entire agent profile) will relate to a single agent only, but as outlined above, the profile may relate to several agents.

Similarly, the prioritised locations listing will preferably relate to a single agent only.

In yet another aspect, the invention provides a computer program product in machine readable form containing instructions which when executed cause an ordering server to:
a) hold current order details which identify at least the location and time at which each agent is expected to become free to fulfil new orders;
b) keep a listing of locations, where each location in the listing is prioritised for an agent according to the availability of the agent to reach that location after the agent becomes free;
c) receive a new order and recording the location and time at which this order is to be fulfilled;
d) decide, based on the prioritised listing of locations, which agent(s) are most suitable to take the new order; and
e) allocate the new order to the identified agent(s).

BRIEF DESCRIPTION OF DRAWINGS

The invention will now be illustrated by the following descriptions of embodiments thereof given by way of example only with reference to the accompanying drawings, in which:

FIG. 1 is a depiction of a grid of locations, illustrating journeys to be made within said grid;

FIGS. 2A and 2B are current order files for two taxis showing details of the journeys in FIG. 1;

FIG. 4 is a partial illustration of the information stored in a journey times file, for use in the method of the invention;

FIGS. 5A and 5B are skillset files based on the journeys depicted in FIG. 1;

FIG. 6 is a more detailed and updated current orders file, corresponding to that of FIG. 2A;

DETAILED DESCRIPTION OF PREFERRED EMBODIMENTS

Figure 3:
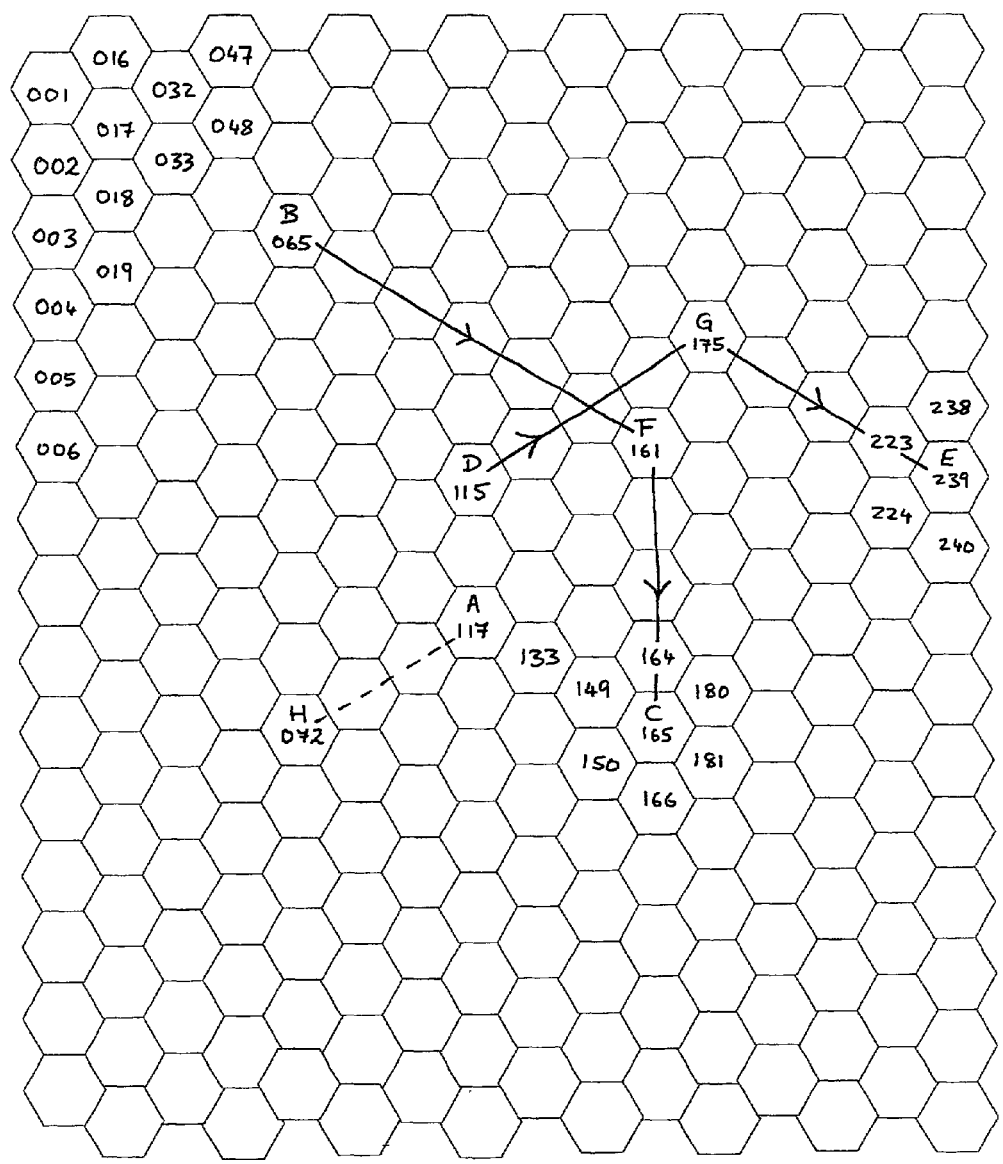
FIG. 3 is a more detailed depiction of the grid of FIG. 1.

The invention can be implemented by, for example, a taxi ordering service dividing its area of operation into a grid, shown in FIG. 1, of adjoining hexagons forming a "honeycomb" pattern.

For the purposes of illustration assume that two cars are active in the grid at the time an order is taken. A caller to the taxi ordering service is located at point A. When the caller at A requests a taxi, a first taxi (referred to below as taxi No. 1) is at point B, on a journey to point C. A second taxi (taxi No. 2) at this point in time is at point D, on a journey to point E.

For the purposes of simplicity it is assumed the taxis can travel in any one of six directions along the grid. Each cell is adjoined by six nearest neighbours. The lines joining the centre of any cell and the respective centre of each of its nearest neighbours define the six permitted directions of travel.

Thus, taxi No. 1 travelling from B to C changes direction at point F (though it could travel via F'). Taxi No. 2 travelling from D to E travels via cell G (or G'). Assuming a one minute journey time from any cell to a nearest neighbour cell, the time taken to travel the route from B to F to C is ten minutes. The time taken to travel from D to E is 8 minutes.

Of course, the situation as shown in FIG. 1 is a highly simplified representation of the movements of taxis within a city. In reality, the journey time expected between any pair of cells is unlikely to be constant, and the freedom of movement will vary depending on street geography, if a cell pattern such as that shown in FIG. 1 is mapped geographically directly onto a city map. One is more likely to have an irregular cell pattern with different journey times to each neighbouring cell, and these journey times may be varied according to time of day or traffic conditions. Some of these complications will be dealt with below after describing the application of the invention in this simplified environment.

The taxi ordering service tracks the progress of orders using call centre software. Each taxi is treated as an agent of the call centre, and for each agent there is a "current orders file", examples of which are shown in FIGS. 2A and 2B. FIG. 2A shows the current orders file for the first taxi and FIG. 2B shows the current order file for the second taxi Each taxi has only one order at the time that the call is received from the caller in cell A. If the call is received at 11.00 a.m., it can be seen that the first taxi is expected to arrive at its destination (C) at 11.10, and the second taxi is due to arrive at destination E at 11.08.

The start position shown in the current orders file for each taxi can be either the position at which the journey originally started, or the current position, based on current or updated location information received from the taxi. Accordingly, an individual taxi can update the call centre on its current position, and the software extrapolates from this the expected time at destination, allowing the current orders files to be dynamically updated.

It will be appreciated that whereas the call centre application works on the assumption that the cell-to-cell journey time is uniform, this can be varied in more sophisticated embodiments to take account of real life situations, where different journey times can be expected between different neighbouring cells. Rather than making the assumption of a set journey time between cells, the drivers could input an estimated time of arrival (ETA) at the destination of a journey.

When an order is received from a caller for a taxi at a particular geographical location, the operator receiving the call inputs the address into the software and a database returns the identity of the cell in which this address is located. The operator will also obtain details of the intended destination of the caller. In the case of the caller in cell A, the destination required is located in cell H (FIG. 1). The caller also specifies when the taxi is required, which in this case is as soon as possible. From this information an order file is generated (which may also include the caller's name, phone number, account or payment details, etc.)

It can be seen from FIG. 1 that the destination of the taxi No. 1 (cell C) is closer to cell A than the destination of taxi No. 2 (cell E). However, FIGS. 2A and 2B show that the second taxi will become free before the first taxi. The call centre software must make a decision as to which taxi should be assigned the order to bring the caller from cell A to cell H. The manner in which this is achieved can be explained with reference to FIG. 3.

FIG. 3 shows a representation of the grid, as maintained by the call centre. Rather than using letters to identify the cells, each cell is actually numbered in a logical fashion with a 3 digit identifier, as shown for cells in the upper left hand corner. Thus, cells are numbered consecutively in vertical columns, the first column beginning 001, 002, 003, ... and so on, with the second column continuing with 016, 017, 018, ..., etc.

The current order files will in fact store the positional information using these cell numbers, and therefore rather than the respective positions B, C, D, E shown in FIGS. 2A and 2B, the cell identifiers 065, 165, 115 and 239, respectively, will be maintained in the current order files for the two taxis mentioned above.

The journey time between any two cells is determined with reference to a "journey time file" which takes the form of an n×n two-dimensional matrix. In the case of the grid shown in FIGS. 1 and 3, there are 248 cells and thus a 248×248 matrix is used. FIG. 4 shows a small proportion of the entries in this matrix. The column and row headings refer to cells within the grid, and the cross-referenced entries show the journey time (in minutes) between any two cells. Thus, the expected journey time between cell 003 and cell 005 is two minutes. Similarly, the expected journey time from cell 048 to cell 004 is 4 minutes.

The journey time file allows one to read the expected journey time between any pair of cells. This can be fixed, or it can be varied to take account of weather, traffic conditions, past journey times, or major disruptions to traffic flows. The file can be dynamically updated by a background system which monitors agents' positions using GPS transmitters in agents' vehicles. The background system notes from the current orders files whether the agent is currently travelling, and if so, it notes the time to travel from cell to cell, and uses average times calculated in this way to modify the journey times file.

As a final point to note in relation to the journey time file, in the simplified embodiment shown, it is assumed that the time taken to travel in both directions between a pair of cells is the same. This need not necessarily be the case, and the journey time file can be modified to take account of journey times in each direction. (For example, if a journey in one direction allowed a straight journey along a one way street but the reverse journey required a detour due to one-way systems, then the outward and return journeys might be different).

Reverting to the example of caller A (in cell 117), it will be recalled that the software must arrive at a determination as to which taxi is best equipped to take the order. Each taxi has a dynamically updated skillset file, shown in FIG. 5. The skillset file is a prioritised listing of the cells which the taxi is best able to service.

Referring to the skillset for taxi No. 1, in FIG. 5A, it is clear that the most suitable orders for this taxi are orders beginning in cell 165, where the current journey terminates. The taxi will be free in cell 165 at 11.10. The software generates and updates the skillset entries for the various cells based on: the destination at which the taxi will become free (determined from its current order file), the time at which the taxi will be free at that location (again from the current order file), and the journey time information from that destination cell to all other cells (from the journey time file).

Every time the current order file for taxi No. 1 is updated with a new final destination at which the taxi will be free or a new ETA, the journey times from that destination point to all other destinations are retrieved from the journey time file and added to the ETA, to generate a listing as shown in FIG. 5A. Thus, this skillset file shows that for the nearest neighbour cells to cell 165 (i.e. 149, 150, 164, 166, 180, 181), the taxi can be available in any one of those cells at 11.11. Proceeding down through the file, the time expected to reach cell 133 is 11.12, and for cell 117 (where caller A has requested a taxi) the skillset entry shows that the taxi can service an order in that cell, based on current information, at 11.13.

Referring to FIG. 5B, the second taxi is expected to be free in cell 239 at 11.07. In the four neighbouring cells, it would be available at 11.08. If it were to travel back to cell 117 to service the order of the caller, it could pass through cell 133 at 11.13, and then turn diagonally upwards on its shortest route to cell 117, reaching it at 11.16.

Every other taxi (if there are more than two taxis) will similarly have a skillset file which is being dynamically updated with every change in final destination and any changes to the time at which the taxi is expected to be free at its final destination. Thus, for each skillset file there will be an entry for cell 117, and the software determines that the taxi best served to service the order of the caller is the taxi which has the earliest time slot for cell 117. In the present case, taxi No. 1 can meet the caller two minutes before taxi No. 2, and therefore the order is assigned to taxi No. 1. Taxi No. 1 may be given the opportunity to accept or refuse the order, or it may simply be instructed to take the order, depending on the degree of control of the ordering service over its taxis.

Once the order is assigned (and accepted, if appropriate) the current orders file for taxi No. 1 is updated. The caller is informed of the time at which the taxi can be expected, and the taxi driver is informed of this next order, which can be transmitted to the taxi and displayed on a display device in the taxi cab. The updated current orders file for taxi No. 1 is shown in FIG. 6. Rather than using the letters b, c, etc. to identify cells as in FIGS. 2A and 2B, the current orders file shown in FIG. 6 uses the same cell reference numbers which the software uses to distinguish cells in the grid. (In practice, the current orders file will also include the actual street address and name of the caller, or will include a reference to the order number, which allows the driver to access the full order details).

As seen in FIG. 6, when the order of the caller is assigned to the first taxi, two new entries in that current orders file are generated. Firstly, there is the journey from the drop-off point 165 to the new pickup point 117, with the taxi being expected to arrive at cell 117 at 11.13 as described above. Then, the taxi is expected to travel from cell 117 to cell 072 in a journey time of 3 minutes, so it is expected to be free at cell 072 at the time 11.16.

Once this current orders file has been updated, the skillset for taxi No. 1 is dynamically updated also, to show the availability of the taxi for all of the other cells beginning with cell 072 at 11.16, its six nearest neighbours at 11.17, and so on. The new entry for cell 117 after this first order has been accepted would be 11.19. This is the time at which the taxi would be able to take the original caller from cell 117 to cell 072, and return to cell 117 to service a second order at that location.

From a consideration of the above it can be seen that if two callers were to order taxis in cell 117 at 11.00, travelling to different destinations, the first caller would be assigned to taxi No. 1, as described above. The second caller would, however, be assigned to taxi No. 2 (which can reach cell 117 at 11.16), rather than waiting for taxi No. 1 to return to cell 117 at 11.19. If, however, the second taxi has already taken another order when a second call arrives from cell 117, the likelihood is that the first taxi will be judged (from the updated skillsets of both taxis) to be in the best position to service the second order from cell 117.

The current orders file in FIG. 6 shows a later order, which has not yet been discussed. It is often the case that taxis are booked in advance for a particular time. An example would be where a caller wishes to catch an early morning flight and books a taxi on the previous evening. In the present case, taxi No. 1 has been assigned an advance order to collect a passenger in cell 019 at 14.00 and deliver them to cell 177. While one can see that there is no difficulty in the taxi fulfilling the order of the caller to travel from cell 117 to cell 072, and still leave ample time to fulfil this advance order, the invention provides a means of determining whether a taxi can fulfil a new order in the light of any advance orders which may have been assigned to that taxi.

A column in the table of FIG. 6 contains a flag for the "last current order" (LCO). The LCO is simply the order following which the agent expects to become free. It can be seen that the first three rows in the current orders file of taxi No. 1 are current orders, with the taxi expected to complete these orders as soon as possible. However, the next order is identified as "advance" by the letter "A" in the LCO column.

This advance flag causes the call server software to determine, when any new order is being assigned to the taxi, whether the taxi can fulfil that new order and subsequently travel to the start position of the advance order in time to meet that order. Thus, in the present case, the system, before accepting the order to travel from 117 to 072, would calculate the time to travel from cell 072 to cell 019 for the advance order. provided that the time for this journey is less than the difference between the ETA at cell 072 and the pick-up time (14.00) at cell 019, the order can be accepted. Otherwise, the new order would be assigned to another taxi so that taxi No. 1 can meet the existing advance order.

The system will therefore keep assigning orders to the most suitable taxi until it is determined that by assigning an order to a particular taxi an advance order for that taxi cannot be fulfilled. In such a case, the order is instead assigned to the next most suitable taxi, and so on. A point may be reached where none of the taxis is available to take an order until after advance orders have been fulfilled, and the caller will be alerted accordingly.

If the order has to be assigned to another taxi, this indicates that taxi No. 1 is approaching the point where it will be required to travel directly from the destination of the LCO to the advance order, and the flags in the LCO column can be changed at this point to designate the advance order as the new LCO.

Having now described the method of the invention with reference to a simplified grid structure used to control taxi orders, a more sophisticated system will be described in greater detail.

Figure 7:
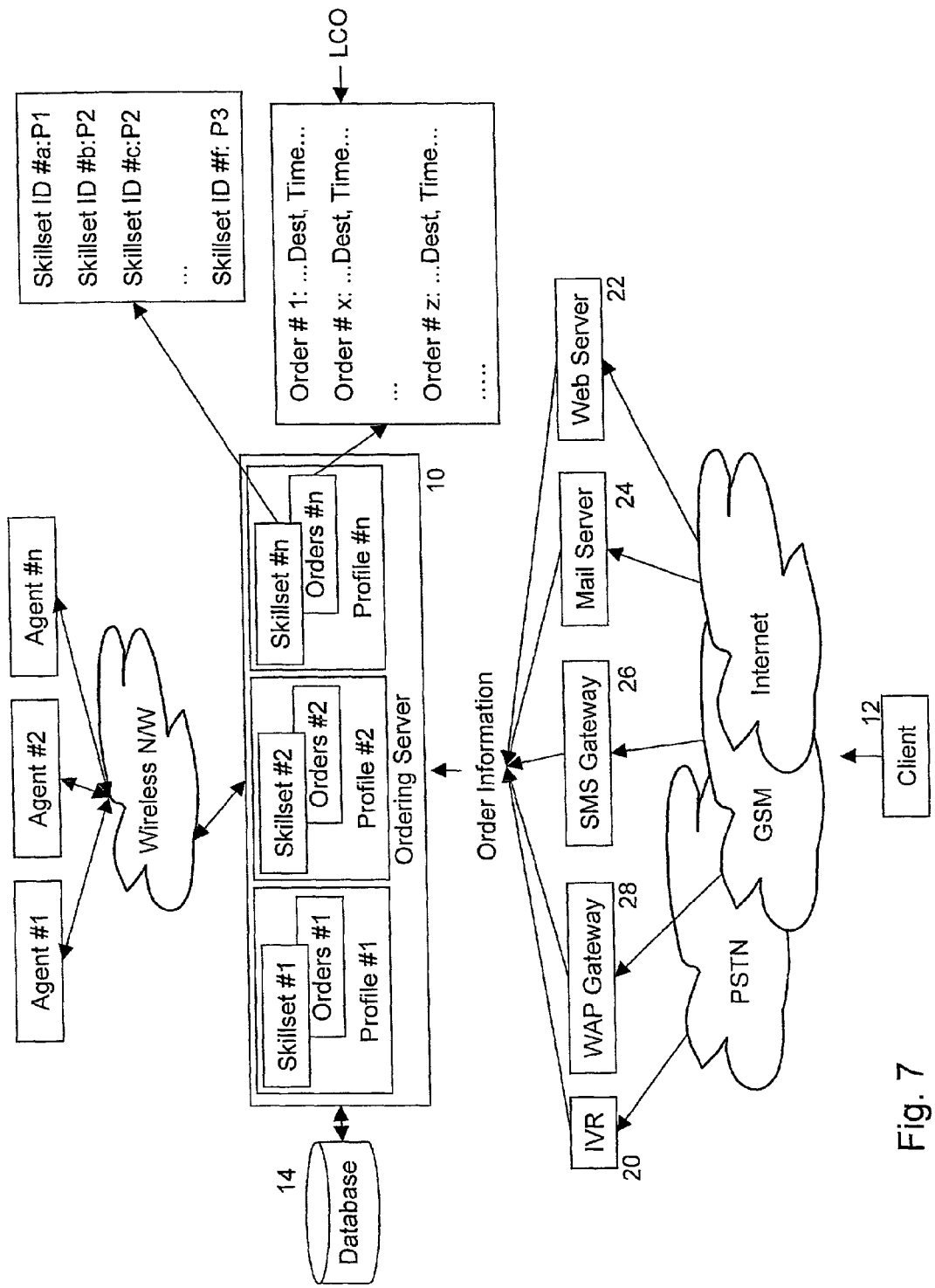
FIG. 7 is an architecture of a system including a call server according to the invention.

Referring now to FIG. 7, the preferred embodiment of the invention comprises an ordering server 10 running call server software such as Symposium from Nortel Networks Corporation of Montreal, Canada. The ordering server is adapted to receive customer requests for a mobile service provided by any one of a number of mobile agents.

In a conventional call center, customer requests enter via the public-switched telephone network (PSTN), usually via a Private Branch Exchange (PBX), such as a Meridian I (from Nortel Networks Corporation of Montreal, Canada), to an automatic call distributor (ACD) providing the control mechanism, such as the Symposium Call Center Server (from Nortel Networks Corporation of Montreal, Canada). An ACD is telecommunications software used in a digital computer that automatically answers calls, queues calls, distributes calls to agents, and plays delay announcements. U.S. Pat. No. 4,451,705 discloses a known type of ACD and is incorporated herein by reference.

Interactive Voice Response (IVR) units may be connected to the ACD allowing additional information to be collected from a caller about the nature of the call and skills an agent may be required to have in order to properly service the call. The caller can be asked a series of questions, and the responses, either spoken or Dual Tone Multi-Frequency (DTMF) inputs from a key pad, can be used to provide additional information to the ACD allowing the call to be routed to an agent who is suited to respond to the caller.

At a conventional call center server, certain skills may be grouped into skillsets and the skillsets internally assigned an electronic identifier. The identifier may then be electronically assigned to an agent having the skills that define the skillset. Skill-Based Routing (SBR) allows call routing based on criteria such as service requirements of a call and the skills of available agents.

For example, in a computer technical support helpline, skillset identifiers would indicate familiarity with different products, operating systems, hardware versus software knowledge, levels of seniority, etc. This would allow the server to quickly identify an agent of supervisor level familiar with software conflicts arising with product X when run on operating system Y.

In the present case, the call is not routed to an agent, but is instead taken as an order which is assigned to an agent. Suitability of agent is dependent on location and time of availability. Thus, the skillset identifiers will be location-based and will assign a priority or degree of suitability of an agent based on the time at which an order can be serviced at a particular location. Other factors may also be called into play such as the suitability of the taxi for a wheelchair user, or the ability of a repair person to deal with a particular problem.

A customer may establish contact with the ordering server from a client 12 by any number of media. In one case the client device is a conventional phone and the user, via a voice connection over the PSTN, provides order information by interacting with an IVR application 20 as described above. Alternatively, any other technique such as an Internet (TCP/IP) connection where order information is provided from a client device either through interaction with a web server application 22 or by simply sending an e-mail to a mail server 24 can be used. Furthermore order information can be sent in a Short Message Service (SMS) message from a conventional mobile phone via an SMS gateway 26 or from a mobile WAP device via a WAP gateway 28 or from an I-mode based client device.

In any case order information for a mobile service at the very least will include a geographical location at which the service is to be provided. In some cases, for example, where the ordering server is supporting a taxi service, both a source location and a destination location is provided. In other cases, for example, where the ordering server is receiving orders for the delivery of goods or a service such as a repair service, only a single location may be provided.

In the preferred embodiment, locations are provided by customers as street addresses and the ordering server is cooperable with a database 14 which converts a street address provided to the database to an identifier corresponding to a call server skillset.

This may be done by any number of means, for example, the database 14 could include a plurality of groups of street names, each group having a group identifier. When a location, provided by a customer in the form of an exact street address, is received by the ordering server 10, it queries the database based on the street name included in the address and this returns a group identifier if a street name matching the query street name is found within the group. Long streets may be broken up into sections and house numbers can thus be supplied in the database query to distinguish sections of streets which may traverse more than one group. As will be explained later, it is also preferable in this embodiment to associate with each group identifier a list of identifiers of groups of neighbouring streets.

As will also be explained later, intelligent grouping of streets can assist in optimising the operation of the invention. So, for example, in areas where it is known that agents can move rapidly, large numbers of adjacent streets can be associated with the same identifier. In areas, such as city centres, where agents move more slowly, single streets or even sections of streets can be associated with a given identifier. The grouping of streets is preferably such that the variation in time to move from any location with a group of streets to any other location in the group of streets is less than any other variations such as the average length of time taken by a taxi ride or the average length of time required to perform a service at a location.

Where this form of database 14 is used, a simple user interface can be provided to enable an administrator to create/amend/delete groups and to define neighbouring groups.

In an alternative, an area across which services are being provided is divided into a regular grid of hexagonal, rectangular, or other cells each having a skillset identifier (as described in the previous embodiment). The ordering server translates the location provided by a customer into an x, y location using either a proprietary or commercially available map database 14', and the database maps the x, y location to a cell of the grid, so returning an identifier. It will be seen that the map database 14' can be stored locally or may in fact be accessed via an Internet connection. In this case, it is easy to determine neighbouring cells, however, if a regular grid is used some other parameter will in practice be associated with each cell if traveling rates within different cells are to be differentiated. Again, a user interface application can be provided to enable an administrator to adjust, for example, the grid resolution and cell traveling rates.

Figure 8:
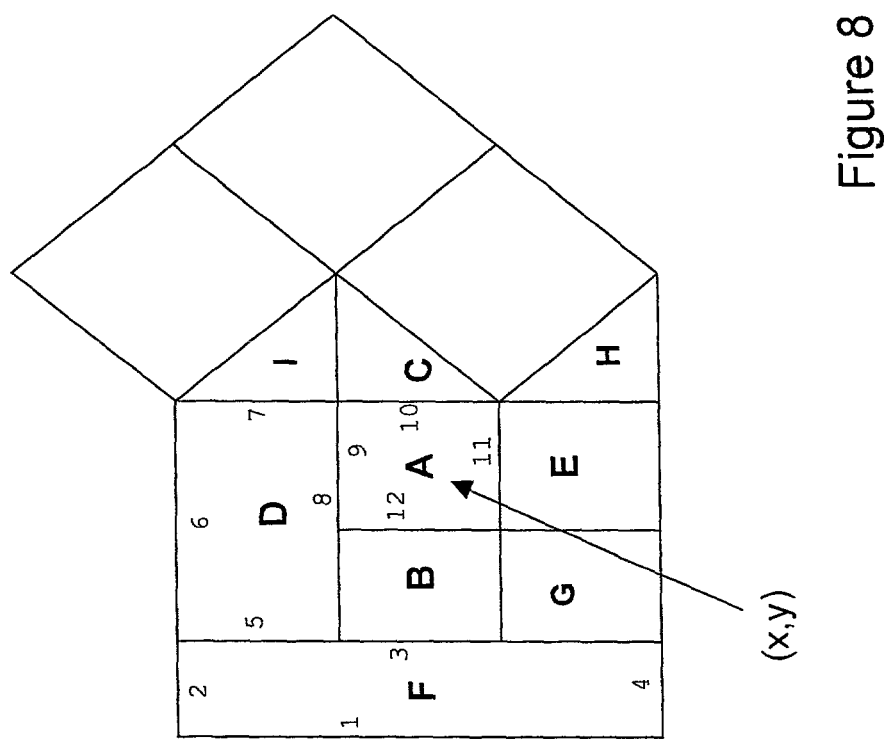
FIG. 8 is a depiction of a mesh of elements used with the server shown in FIG. 7.

In the preferred embodiment under discussion, however, the area across which services are being provided is divided into a mesh 14" of elements, each having a skillset identifier. In the present example, the elements comprise rectangles and triangles, and an example of such a mesh is shown in FIG. 8. This type of mesh can be thought of as an irregular grid, and is analogous to the grid of FIGS. 1 and 3.

The data structures required to define and traverse such a mesh are varied but in any case are well known. They include storing a list of the vertices comprising each element, usually in a predetermined order clockwise or anti-clockwise, with each vertex pair, (n,n+1 mod n+1) where 0≤n≤2 or 3, defining an edge of an element. Thus, given an x, y location and an element identifier, simple trigonometry can be used to determine if the x, y location lies inside an element by testing if the x, y location lies to a given side of each edge of an element.

A set of neighbour elements is usually stored for each element, so that in the example of FIG. 3, element A has neighbour elements B, C, D and E. Thus, if a location x, y is provided, the mesh is traversed beginning at a predetermined element, in this case element F. When comparing the x, y location to edge 3, the x, y location is determined to be outside element F. The neighbouring element D is then tested until at edge 8, the x, y location is determined to be outside this element. Regardless, of whether neighbour element A or B is tested next, element A will ultimately be returned as the element including the x, y location. In this way, a map x, y location, or a latitude/longitude position derived from GPS data, can be placed in a mesh element.

In this variation, large size elements such as element F can be used for areas where agents travel relatively rapidly, whereas smaller sized cells, such as the triangular elements C, H and 1 can be used where agents travel more slowly. Again a mesh definition interface 16 is provided to enable an administrator to define the mesh 14". This preferably works in conjunction with the map database 14', so that the mesh can be superimposed over a map enabling accurate definition of the mesh with respect to traffic routes.

In the preferred embodiment, a profile of each agent is kept on the ordering server 10 (FIG. 7). The profile includes for each agent, a current orders file, as described in relation to the first embodiment, having list of any orders being serviced by the agent including, for each order an agent has accepted, the location(s) at which the service is provided, the estimated time at which the agent will be free as well as any other details provided in the order information.

A pointer to an agent's last current order (LCO) is also maintained for each current order file. This is because, in the preferred embodiment, order information can specify, in a number of variations, a time at which a customer wishes to receive a service. In a first variation, the customer simply wishes the service to be performed as soon as possible. When an agent accepts such an order, a start and an end time for the provision of the service will be provided to the customer based on the estimated time to complete the agent's previous LCO and travel to the new location. The LCO is then updated to point at the new order, with the system assuming that the agent will move from completing the previous LCO to the updated LCO.

In a second variation, the customer specifies a time before which they need the service to begin or complete. When the agent best positioned to service the order is identified, the estimated time to complete the agent's current LCO is compared with the customer provided time. If the estimated time and/or the estimated time plus the time taken to complete the service is after the customer specified time, the customer is advised that their order cannot be serviced, so allowing them either to specify a later time, or as in the first variation to leave the request open and to allow an agent to return with an earliest time at which the service can be provided.

In a third variation, the customer may wish to book a service several hours or days ahead. Such a request is not allocated to agents based on their availability following their LCO. Rather, the request is broadcast, as explained below, to one or more agents who may wish to receive such orders. When an agent accepts the order, it is added to their order list, but their LCO pointer is not updated.

The agent may thus continue to accept orders based on their LCO, until a point at which the location and estimated time to complete a service at the location of the LCO mean the agent can no longer accept orders prior to their pre-booked order. At this point the LCO pointer is advanced to point at the pre-booked order, and the agent's availability is determined accordingly.

Turning now to the second aspect of an agent's profile, Symposium from Nortel Networks provides an application program interface (API) to enable changing of an agent's skillset/priorities. In the preferred embodiment, one or more skillset identifiers corresponding to either a group of streets, a grid cell or a mesh element and preferably either its neighbours or all other groups/cells/mesh elements, as well as a priority associated with each skillset identifier are maintained as attributes of a mobile agent's skillset file.

Thus, where an agent is for example a taxi, the skillset file for the agent in the present embodiment stores the skillset identifier corresponding to a destination address and a priority for that identifier based on the difference between a current time and the estimated time to arrive at the address of the new order, as previously described.

Where an agent is performing a service at a location, for example, repairing a machine, then the skillset file for the agent will store the skillset identifier corresponding to the location and a priority based on the difference between a current time and an estimated time at which the service at the LCO location will finish.

The ordering server periodically issues an API command to change an agent's skillset file. As the estimated time for the agent's LCO approaches, the priority of that agent within the skillset is increased, again through the API.

Thus, when an agent accepts another (non pre-booked) order, the agent's skillset file is updated based on the location of their new LCO. As indicated above, the agent's skillset file may also include skillsets for neighboring grids at a lower priority. Thus, if an agent's last current order is to provide a service at location or to a destination location in element A, FIG. 8, and expects to complete the service at that location at time T1, then at time T0 (where T0 is before T1), the agent will have a given priority P1 associated with the identifier of element A. The agent can also be allocated a skillset and priority of P2 where say P2=P1/2 for each of the neighbouring skillset identifiers corresponding with elements B, C, D and E. Similarly, the agent can be allocated a skillset and priority of P3 where say P3=P1/3 for each of the next neighbouring skillset identifiers corresponding with elements F, G, H, I etc.

Figure 9:
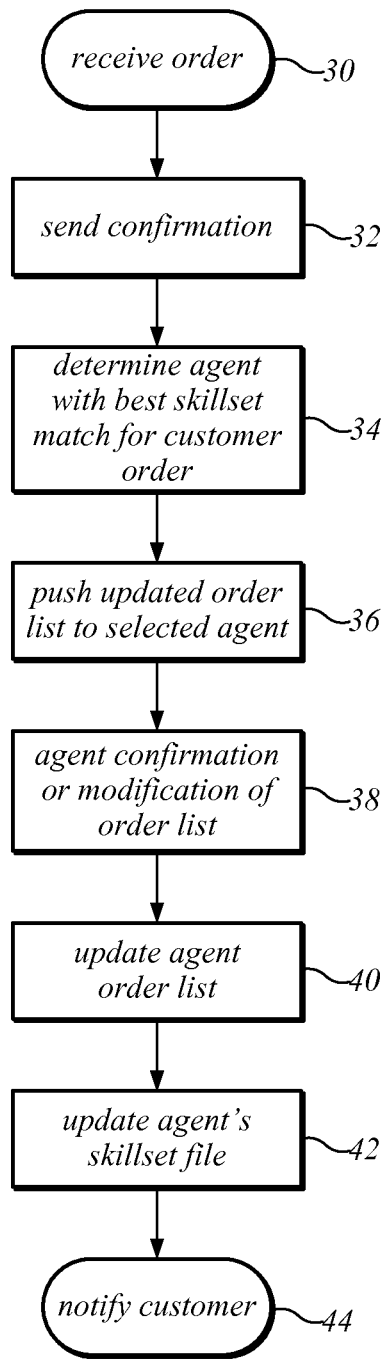
FIG. 9 is a flowchart illustrating the operation of a computer program product according to the invention.

Referring now to FIG. 9 and the operation of the preferred embodiment of the invention, on receiving order information from a customer, step 30, usually some acknowledgment is provided preferably confirming the details provided by the customer, step 32. If the customer has provided return contact details in the order information, for example, a phone number or an e-mail address, the customer can then disconnect or log-off from the ordering server while the server attempts to locate a mobile agent to provide the service by comparing the order information with the skillset files of the agents, step 34.

Thus, orders are routed to agents having a skillset identifier matching a skillset identifier associated with the location at which a service is to be provided for the order. Where the service is, for example, a taxi service the skillset identifier for the order will correspond with the source location; whereas where only a single location is specified, the skillset identifier will correspond with this location. This can result in the server identifying as suitable all agents having a skillset identifier matching the order information, or only the agent with the highest skillset priority for the order location. The customer may stay online while the server locates the agent. If there are no agents matching this skillset identifier for the order, the order is offered to all idle agents—that is agents with no outstanding orders in their order list.

It will also be seen that orders may be offered to more than one agent—either based on that agent having the appropriate skillset or having a priority greater than a threshold for the skillset. In this case, orders may be offered to agents in sequence, until an agent accepts, or they may be offered in parallel, and withdrawn as soon as one agent accepts.

When an agent completes all outstanding orders and as such becomes idle, the ordering server can on the one hand remove all the skillset identifiers from that agent's skillset file after a pre-determined period of time, assuming that the agent has left the last location. If the agent is then actively seeking orders they can if they wish connect to the server using any media available to the clients of FIG. 7, and through either suitable IVR, WAP or web applications provide their current location. This location is then translated to a skillset identifier and, as the agent is free, allocated a highest priority for that identifier. Thus, only busy agents who are either on their way to the vicinity of a given location or idle agents in the same area as the location of an incoming order are notified of the order.

It will also be seen that as well as adjusting a skillset, the agent can also connect to the ordering server 10, again by any of the above described media, to directly view/accept/cancel orders in the agent's order list.

In the preferred embodiment, agents are equipped with WAP enabled phones, enabling orders to be pushed out to agents who are most likely to be able to service an order. It will be seen, however, that the invention is not limited to WAP and that there are different ways of notifying an agent of an incoming order, for example, the ordering message could send a Short Message Service (SMS) message through the SMS gateway 26 (FIG. 7) which may also be used to receive client order information. It will also be seen that while it is advantageous to asynchronously push orders out to agents, the invention is not so limited, and could equally be implemented by having agents periodically poll the server 10 to determine if new orders are available.

Nonetheless, in the preferred embodiment, the WAP Push Access Protocol (PAP) and Push Over-The-Air (OTA) Protocols are used by the ordering server to notify agents of incoming orders. The Push Access Protocol is used to send order information between the Ordering Server 10 and a Push Proxy Gateway 18. The Push OTA Protocol is then used for sending order information between the Push Proxy Gateway 18 and agents.

In the preferred embodiment, step 36, the order information is pushed to the identified agent (it is assumed that one agent has been identified here as having the highest priority for the location of the order). The pushed order information comprises an update of an agent's existing order list i.e. it contains all orders on the list and updated status for each order, including the new order.

The agent through interaction with an application running on the agent device, can then accept a new order or change the status of existing orders, step 38. Each order is associated with a flag, with orders that have not been accepted being unflagged. Orders that are accepted by the agent are flagged as 'owned' by the agent and, in the case where orders are simultaneously sent to more than one agent, orders flagged by one agent are removed from any other agent's list. (Again PAP/PPG and Push OTA can be used to send any updated lists to agents who will then not have the option to accept the order.)

The agent can thus change the state of any order by flagging or unflagging it. Where orders are sent to agents in sequence, an order left unflagged for a fixed amount of time is routed to the next suited agent (based on skillset and priority).

In the preferred embodiment, on flagging an order, a combination of server and agent are used to specify an estimated time for completing the service. Where the agent is providing a taxi service, the time for picking up a customer at the source location can be initially set by the server 10 in the pushed order list, as the estimated time to arrive at the destination location of the LCO plus an estimate of traveling time across the groups, cells or mesh elements that separate the destination location of the LCO from the source location of the new order which will if accepted become the LCO.

If the new order is in fact a pre-booked order, the time for picking up the customer or beginning a service will be that supplied by the customer. The agent may then provide an estimate of the time to complete the service. In the case of a taxi service, this requires estimating the time to travel from the source to destination location of the new order and this may again be pre-calculated by the server 10 based on any combination of the distance between the source and destination and the number of groups, cells or mesh elements separating the source and destination. In the case of say a repair service, the time to complete the service is a simple estimate of the time to provide the service at the location, and this again may be pre-calculated or pre-allocated by the server 10.

In any case, it is always possible in the current embodiment for the agent to subsequently change a flag, by connecting to the server, preferably using a one button call, and to be presented, preferably as a home page, with their order list. The agent accepts/declines/views orders in the list and may also alter order times, following which the agent logs off.

Once the order is accepted i.e. an agent has assumed ownership and provided the required times, step 38, the accepted order is processed by the server which makes any further necessary changes to the agent's order list in the light of the agent's actions in updating the list or estimating times, step 40.

The server also opens the agent's skillset file, step 42, to update the skillset priorities in the light of the new LCO. The skillset files will similarly be updated as time progresses to change priority ratings, and are also updated whenever any agent actively changes his or her order files, e.g. by sending in new estimated arrival times at the destination of the LCO.

The customer can then be notified of the estimated time for fulfillment of the order, step 44, by using the contact information originally supplied with the order. The order can subsequently be tracked by the customer who may view or listen to the progress of the order by reconnecting to server and, for example, entering an order number or their name before being supplied with the order information. Alternatively, if the customer remains connected to the server, he or she could be notified directly of the acceptance of the order and they could continue to track the order at will.

It will be seen that while the invention has been described in terms of agents using conventional WAP cellphones, the invention is equally adaptable to take into account improvements in mobile devices. For example, GSM phones are becoming available with GPS functionality built in Parthus, of Dublin, Ireland have announced a new product, NavStream (Trade Mark) which is a single chip GPS designed to be integrated into cellular handsets—see http://www.parthus.com/ and these could be used to provide improved tracking resolution of agents, and thus more accurate updating of current order files and skillset files.

The invention is not limited to the embodiments described herein which may be varied without departing from the spirit of the invention.

What is claimed is:

1. A computer-implemented method of allocating a location-related order to one of a plurality of mobile agents, said method being carried out by an ordering server programmed to carry out the steps of the method, which comprise:
    a) maintaining a current order record identifying a first location and first time at which each agent is expected to become free to fulfill a new order;
    b) maintaining a prioritized listing of locations including both scheduled locations which an agent is currently due to visit and unscheduled locations which said agent is not currently due to visit, with locations in said listing being prioritized to rank both the scheduled and unscheduled locations for said agent according to availability of the agent to reach each location after said first time, said availability having been calculated for each location irrespective of whether or not said agent is currently due to visit a particular location in said listing;
    c) receiving said location-based order and recording the location and time at which said order is to be fulfilled;
    d) determining from said prioritized listing of locations a suitable agent to fulfill said order; and
    e) allocating said order to said suitable agent.

2. A computer-implemented method according to claim 1, wherein step a) comprises maintaining for each agent an individual current order file relating only to that agent.

3. A computer-implemented method according to claim 1, wherein step a) comprises maintaining a combined current order file relating to a plurality of agents, with said first location and first time identified for each such agent.

4. A computer-implemented method according to claim 1, wherein step b) comprises maintaining for each agent an individual prioritized location listing relating only to that agent.

5. A computer-implemented method according to claim 1, wherein step b) comprises maintaining a combined prioritized location listing relating to a plurality of agents, with each location being prioritized for one or more agents according to ability of the or each such agent to reach each location after said first time relating to the agent.

6. A computer-implemented method according to claim 1, further comprising the step of:
    updating the current order record for said identified agent with a new first location and first time at which said agent is expected to become free after fulfilling said order.

7. A computer-implemented method according to claim 6, further comprising the step of updating the prioritized listing for said identified agent when said order has been allocated, to take account of said new first location and new first time.

8. A computer-implemented method according to claim 1, wherein said step of allocating said order comprises
    i) offering said order to said agent; and
    ii) receiving confirmation of acceptance of the order from the agent.

9. A computer-implemented method according to claim 1, wherein said current order record identifies locations and times relating to all current orders assigned to said agent.

10. A computer-implemented method according to claim 1, wherein said listing of locations identifies the priority of each location with a time at which the agent is expected to be able to reach said location.

11. A computer-implemented method according to claim 1, wherein said listing of locations identifies the priority of each location with a priority identifier calculated from distance between each such location and said first location, and time between the current time and said first time.

12. A computer-implemented method according to claim 11, wherein said distance is a true geographical distance.

13. A computer-implemented method according to claim 11, wherein said distance is a distance calculated in a non-linear representation of an area including said locations.

14. A computer-implemented method according to claim 13, wherein said representation is selected from a grid of cells to which locations are mapped, a set of groups of locations, and a mesh of elements to which locations are mapped.

15. A computer-implemented method according to claim 1, wherein said locations are identified as cells within a grid to which locations are mapped.

16. A computer-implemented method according to claim 1, wherein said locations are identified as groups of locations within a set of such groups.

17. A computer-implemented method according to claim 1, wherein said locations are identified as elements within a mesh of elements to which locations are mapped.

18. A computer-implemented method according to claim 1, wherein said first time is calculated from a journey time file which records expected journey times between locations.

19. A computer-implemented method according to claim 1, wherein said first time is input by an operator based on an expected journey time.

20. A computer-implemented method according to claim 19, wherein said operator is the agent to which the current order record relates.

21. A computer-implemented method according to claim 1, wherein the step of maintaining said current order record includes providing access to an agent to said current order record to edit the details recorded therein.

22. A computer-implemented method according to claim 1, wherein said current order file further includes details of an advance order, including a second location and a second time after said first time, at which said advance order is to be fulfilled, and wherein step d) includes the step of determining whether the agent is expected to be able to finish said new location-based order with sufficient time to fulfill said advance order.

23. A computer-implemented method of operating an ordering server for controlling location-based orders for a plurality of mobile agents, comprising the steps of:
 a) maintaining a current order record identifying for each agent a first location and first time at which the agent is expected to become free to fulfill a new order;
 b) maintaining a prioritized listing of locations including both scheduled locations which an agent is currently due to visit and unscheduled locations which said agent is not currently due to visit, with locations in said listing being prioritized to rank both the scheduled and unscheduled locations for said agent according to availability of the agent to reach each location after said first time, said availability having been calculated for each location irrespective of whether or not said agent is currently due to visit a particular location in said listing; and
 c) updating said current order record and said listing for an agent when a new order has been assigned to said agent resulting in a new first location and first time being identified.

24. An ordering server for allocating location-based orders to a plurality of mobile agents associated with said server, comprising:
 a) a current order file storage area for maintaining a current order file which identifies for each agent a first location and first time at which the agent is expected to become free to fulfill a new order;
 b) a location priority listing storage area for maintaining a prioritized listing of locations including both scheduled locations which an agent is currently due to visit and unscheduled locations which said agent is not currently due to visit, with locations in said listing being prioritized to rank both the scheduled and unscheduled locations for said agent according to availability of the agent to reach each location after said first time, said availability having been calculated for each location irrespective of whether or not said agent is currently due to visit a particular location in said listing;
 c) an input interface for receiving said location-based order and recording the location and time at which said order is to be fulfilled;
 d) a processor for determining from said prioritized listing of locations a suitable agent to fulfill said order; and
 e) an output interface for allocating said order to said identified agent.

25. An ordering server according to claim 24, wherein said input interface comprises an operator interface for an operator to input details received from an ordering party.

26. An ordering server according to claim 24, wherein said input interface is selected from a web server hosting a user interface via which ordering parties can input order details, a Wireless Application Protocol (WAP) server hosting a user interface via which ordering parties can input order details, an Interactive Voice Response (IVR) unit via which a user can input order details and a Short Messaging Service (SMS) gateway for receiving SMS messages containing order details.

27. An ordering server according to claim 24, further comprising a map database correlating real geographical locations with location identifiers for use in identifying locations in said current orders file and said listing.

28. An ordering server according to claim 24, further comprising a journey times calculator for calculating an expected journey time between two locations.

29. An ordering server according to claim 24, further comprising an agent interface for an agent to access and edit said current orders file.

30. A non-transitory computer readable-medium storing program instructions which when executed in an ordering server cause said ordering server to:
 a) maintain for each agent a current order record identifying a first location and first time at which the agent is expected to become free to fulfill a new order;
 b) maintain for each agent a prioritized listing of locations in the vicinity of said first location including both scheduled locations which an agent is currently due to visit and unscheduled locations which said agent is not currently due to visit, with locations in said listing being prioritized to rank both the scheduled and unscheduled locations for said agent according to availability of the agent to reach each location after said first time, said availability having been calculated for each location irrespective of whether or not said agent is currently due to visit a particular location in said listing;
 c) receive said location-based order and recording the location and time at which said order is to be fulfilled;
 d) determine from said prioritized listing of locations a suitable agent to fulfill said order; and
 e) allocate said order to said identified agent.

31. A communications network comprising an ordering server for allocating location-based orders to a plurality of mobile agents associated with said server, comprising:

a) a current order file storage area for maintaining a current order file which identifies for each agent a first location and first time at which the agent is expected to become free to fulfill a new order;
b) a location priority listing storage area for maintaining a prioritized listing of locations including both scheduled locations which an agent is currently due to visit and unscheduled locations which said agent is not currently due to visit, with locations in said listing being prioritized to rank both the scheduled and unscheduled locations for said agent according to availability of the agent to reach each location after said first time, said availability having been calculated for each location irrespective of whether or not said agent is currently due to visit a particular location in said listing;
c) an input interface for receiving said location-based order and recording the location and time at which said order is to be fulfilled;
d) a processor for determining from said prioritized listing of locations a suitable agent to fulfill said order; and
e) an output interface for allocating said order to said identified agent.

\* \* \* \* \*